(12) United States Patent
Halderman

(10) Patent No.: US 6,379,036 B1
(45) Date of Patent: Apr. 30, 2002

(54) METHOD FOR MEASUREMENT OF DURATION OF MOLTEN STATE FOR SOLDER DURING REFLOW

(75) Inventor: Jonathan D. Halderman, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/578,454

(22) Filed: May 26, 2000

(51) Int. Cl.[7] .................. G09F 7/00; G01D 21/00; G01K 3/00
(52) U.S. Cl. .............. 368/101; 368/114; 368/327; 116/206; 116/217; 374/102
(58) Field of Search .................. 368/113, 114, 368/327, 89, 97, 101; 374/101–104, 160; 116/206, 308

(56) References Cited

U.S. PATENT DOCUMENTS

| | | | | |
|---|---|---|---|---|
| 3,242,733 A | * | 3/1966 | Johnson | |
| 4,229,976 A | | 10/1980 | Jones | 73/371 |
| 4,404,922 A | * | 9/1983 | Morane et al. | 116/206 |
| 4,408,557 A | * | 10/1983 | Bradley et al. | 116/206 |
| 4,488,822 A | * | 12/1984 | Brennan | 374/101 |
| 5,368,905 A | * | 11/1994 | Ohno | 374/160 |
| 5,779,363 A | | 7/1998 | Freire et al. | 374/33 |
| 6,269,764 B1 | * | 8/2001 | Adamy et al. | 116/206 |

* cited by examiner

*Primary Examiner*—Vit Miska

(57) ABSTRACT

An instrument and a method for measuring a duration at or above a predetermined temperature, such as a solder reflow temperature, are disclosed. The instrument includes a capillary tube and an indicator material that is solid at temperatures below the predetermined temperature and a liquid that will move into and through the capillary tube at and above the predetermined temperature. In the method according to the invention, an instrument according to the invention is heated, then cooled. The amount of indicator material in the capillary tube indicates how much time the instrument spent at temperatures at or above the predetermined temperature. The instrument and method are useful, for instance, for indicating the length of time an integrated circuit package is at or above a solder reflow temperature during manufacturing processes.

17 Claims, 5 Drawing Sheets

METHOD FOR MEASUREMENT OF DURATION OF MOLTEN STATE FOR SOLDER DURING REFLOW

FIELD OF THE INVENTION

The present invention relates to an instrument and method for measuring the duration of exposure to temperatures at or above a predetermined temperature, such as a solder reflow temperature. The instrument and method are useful, for instance, for determining duration of a molten state for an integrated circuit assembly during a manufacturing process, such as a solder reflow process.

BACKGROUND OF THE INVENTION

Interconnection and packaging related issues are among the main factors that determine not only the number of circuits that can be integrated on a chip, but also the performance of the chip. These issues have increased in importance as advances in chip design have led to reductions in the sizes of features on transistors and enlargements in chip dimensions. Industry has come to realize that merely having a fast chip will not result in a fast system; it must also be supported by equally fast and reliable packaging.

Essentially, packaging supplies the chip with signals and power, and performs other functions such as heat removal, physical support and protection from the environment. Another important function of the package is simply to redistribute the tightly packed I/Os off the chip to the I/Os of a printed wiring board.

An example of a package-chip system is the "flip-chip" integrated circuit mounted on an area array organic package. Flip-chip mounting entails placing solder bumps on a die or chip, flipping the chip over, aligning the chip with the contact pads on a package substrate, and reflowing the solder balls in an oven to establish bonding between the chip and the substrate. This method is advantageous in certain applications because the contact pads are distributed over the entire chip surface rather than being confined to the periphery, as in wire bonding and most tape-automated bonding (TAB) techniques. As a result, the maximum number of I/O and power/ground terminals available can be increased, and signal and power/ground interconnections can be more efficiently routed on the chips. With flip-chip packaging, proper heating of the chip and the package is essential to ensure proper operation of the final assembly.

It is known in the prior art to package plural discrete integrated circuit components on a single package substrate. For instance, a package may comprise several chips or dice, capacitors, resistors, diodes, etc. It is also known that various integrated circuit components have widely varying heat capacities and coefficients of heating. For instance, small components may heat very quickly, whereas larger components may heat relatively slowly. It is also known that various components have different tolerances to heat. For example, smaller components may be more susceptible to thermal breakdown due to their tendency to heat more quickly than larger components. Thus, it remains a problem in the art that, when packaging several different components on the same package substrate, smaller or more thermally sensitive components may be unduly stressed at temperatures that do not adversely affect larger and less thermally sensitive components.

Moreover, it is not possible to determine heat tolerances of various integrated circuit components except by empirical tests. In such an empirical test, a number of components of the same type are subjected to heating for various lengths of time (holding oven temperature constant), or at various oven temperatures (holding time constant), or both. The results of such empirical testing are data relating to the heat tolerance of the component. However, this type of empirical test does not provide other valuable information relating to the packaging of integrated circuit packages, such as the length of time that the component spends at and above a particular temperature. This information is not provided by the above-described test, because the temperature of the oven at a particular time is not necessarily the temperature in the proximity of the component, as it takes some time for a component's temperature to reach equilibrium with the oven temperature. Accordingly, an oven may be heated to a particular temperature, such as a solder reflow temperature, but one or more component may not achieve that temperature, or may achieve that temperature only briefly. As a result, manufacturers often find that a part is tolerant to heating at a particular oven temperature for a particular amount of time, only to find later, during production, that this particular combination of oven temperature and time are insufficient to achieve bonding of the component to a package substrate. Moreover, during production the indicated oven temperature generally differs more or less from the actual oven temperature. This phenomenon is at least in part due to the cumulative effect of having several components, all of which are absorbing heat at various rates, in the oven at once. Therefore it remains a problem in the art that it is not currently practical to confirm that a package assembly comprising a plurality of components that is introduced into a reflow oven will reach and exceed a particular temperature, such as a solder reflow temperature, for an appropriate length of time.

There is therefore a need in the art for an instrument that will measure the duration of heating of an article, component or assembly of components a temperatures equal to and greater than a predetermined temperature, such as a solder reflow temperature. There is also a need in the art for a method employing such an instrument for determining the length of time that and article to be heated, such as an integrated circuit package, is at temperatures equal to and above a predetermined temperature, such as a solder reflow temperature.

SUMMARY OF THE INVENTION

The present invention meets the need in the art for an instrument that will measure the duration of heating an article, component or assembly of components at temperatures equal to and greater than a predetermined temperature, such as a solder reflow temperature. An instrument according to the present invention comprises a capillary tube having an opening and an indicator material, such as a meltable solid, which has a melting point at the predetermined temperature. The indicator material is adjacent and in contact with the capillary tube opening. When an instrument according to the present invention is heated to a temperature equal to or above the predetermined temperature, the indicator material melts and begins to move into the capillary tube by capillary action at a time-dependent rate, such as a linear rate. When the instrument is cooled below the predetermined temperature, the indicator material solidifies and remains in the capillary tube. The amount of indicator material present in the capillary tube is related to the amount of time the instrument spent at temperatures at or above the melting point of the indicator material. The duration of heating of an instrument according to the present invention at temperatures equal to and greater than a predetermined temperature is then indicated by the instrument of the present invention.

The present invention meets a need in the art for a method of empirically determining the duration of actual temperatures at or above a predetermined temperature, such as a solder reflow temperature. In a method according to the present invention, an instrument according to the present invention is placed in proximity to an article or articles to be heated, heated along with the article or articles, and then cooled. The amount of indicator material in the capillary tube is used to determine the duration of the indicator material at or above the predetermined temperature.

The present invention also meets a need in the art for an instrument and a method of measuring and indicating duration of actual temperatures within a heating device, such as a reflow oven, at temperatures at and above a predetermined temperature, such as a solder reflow temperature. An instrument according to the present invention is small, on the order of 1–10 cm in length, and thus may be placed close to an article to be heated within the heating device. This permits convenient measurement of duration of heating at temperatures equal to and greater than a predetermined temperature, such as a solder reflow temperature.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF THE INVENTION

Figure 1:
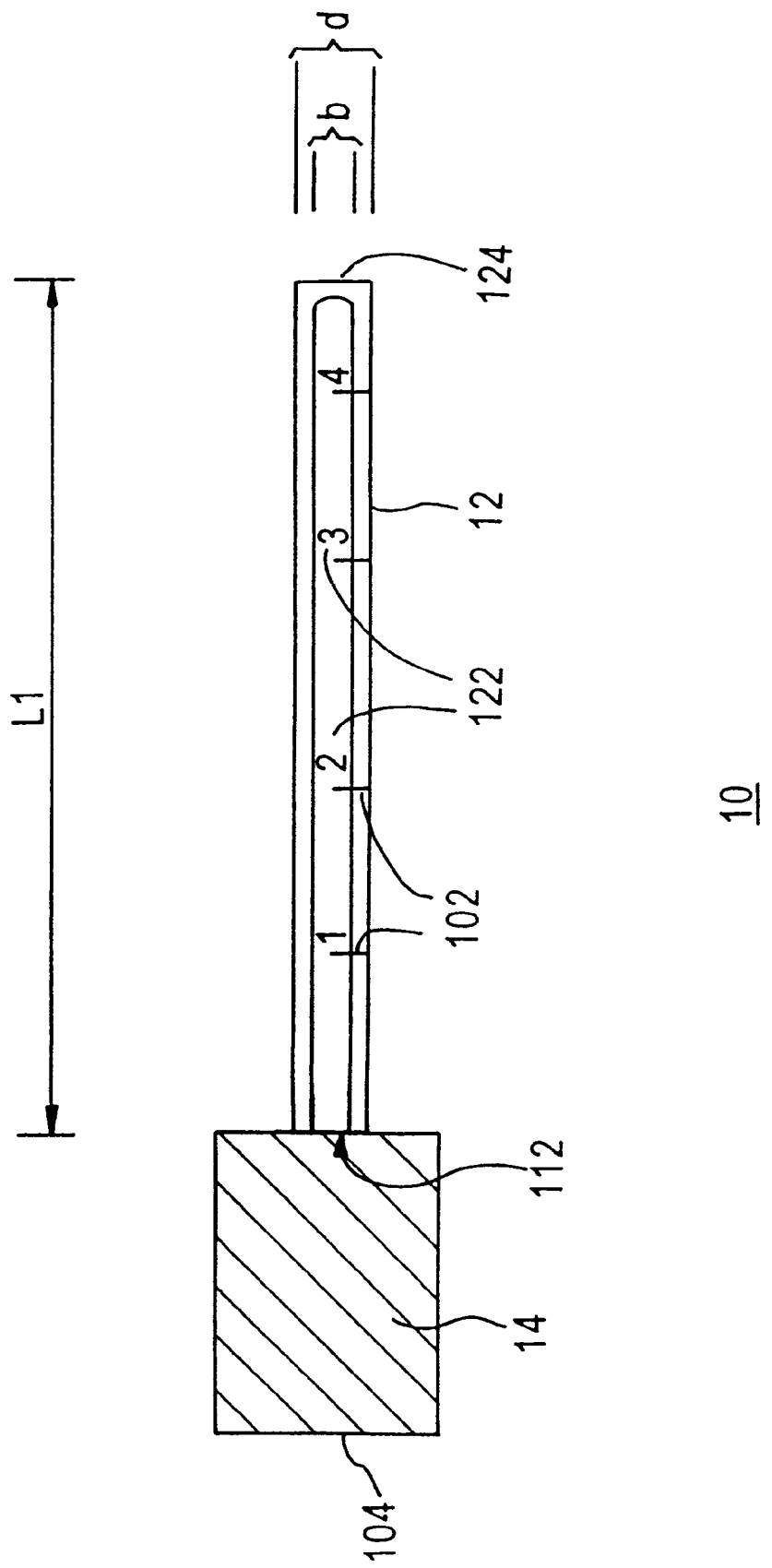
FIG. 1 is a side view of a an embodiment of a free standing instrument according to the present invention.

A free-standing instrument 10 according to the present invention is depicted in FIG. 1. The instrument 10 comprises a capillary tube 12 having an opening 112 and end 124. The distance between opening 112 and end 124 of capillary tube 12 is the capillary tube length L1. A reservoir 104 is integral with the capillary tube 12 and contains indicator material 14, which is adjacent and in contact with the opening 112 of capillary tube 12. The capillary tube 12 has graduated length indicia 102 and numerical indicia 122. The capillary tube 12 has inner diameter (bore) b and outer diameter d.

Figure 2:
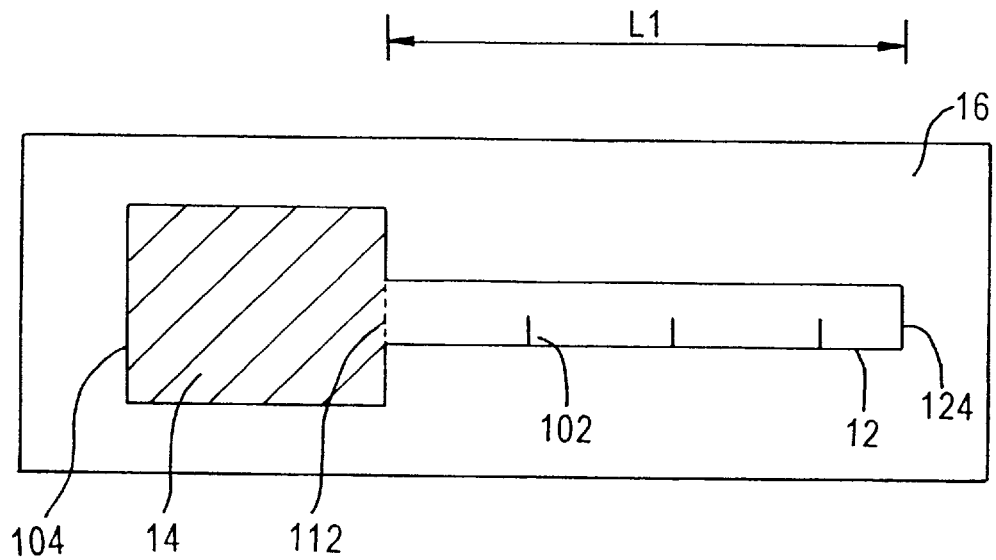
FIG. 2 is a cutaway side view of an embodiment of an instrument according to the present invention having a housing body.
Figure 3:
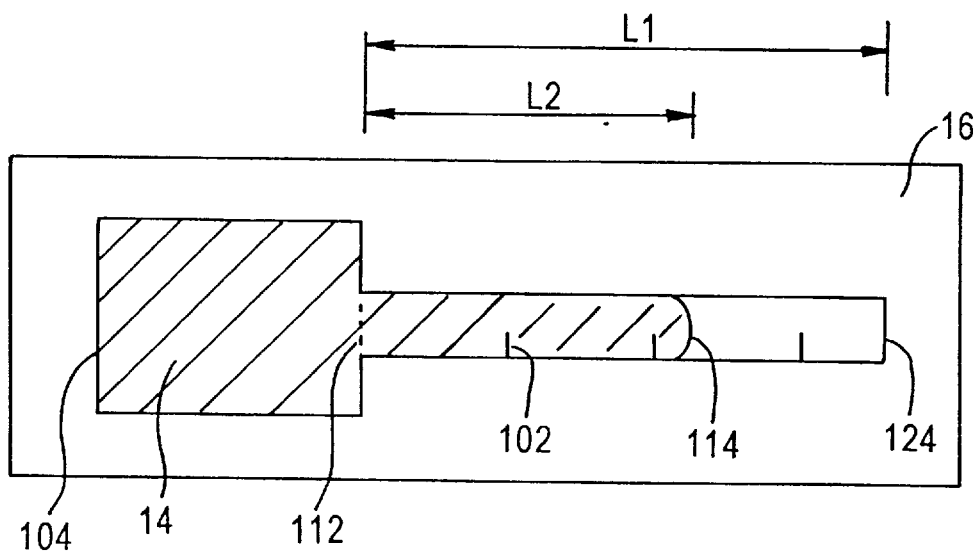
FIG. 3 is a cutaway side view of an embodiment of an instrument according to the present invention having a housing body after it has been heated to a temperature above a predetermined temperature and then cooled to a temperature below the predetermined temperature.
Figure 4:
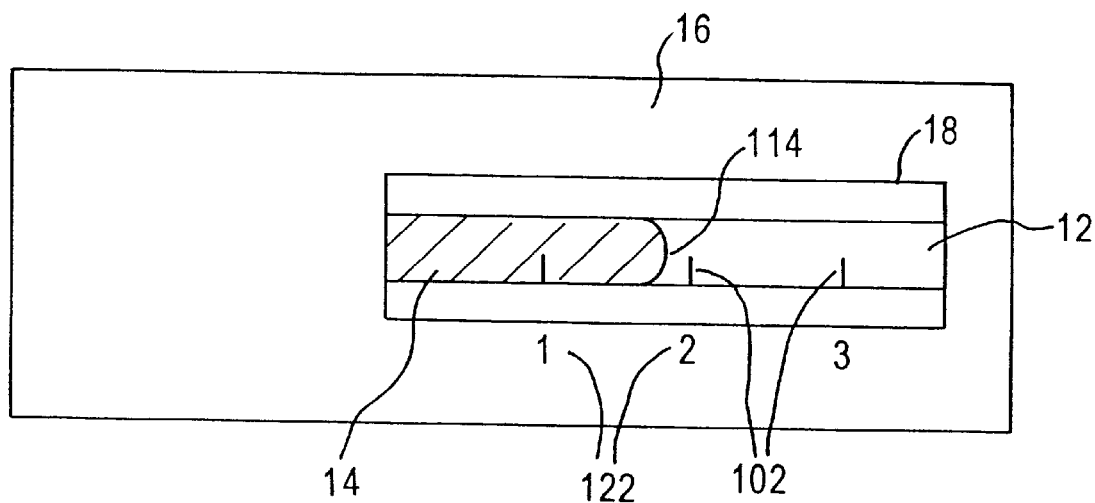
FIG. 4 is an elevational side view of the embodiment according to the present invention depicted in FIG. 3.

Another exemplary embodiment of an instrument 20 according to the present invention is depicted in FIGS. 2–4. FIG. 2 depicts a cutaway side view of an instrument 20 according to the present invention. The instrument 20 comprises a capillary tube 12 having an opening 112 and an end 124. The distance between opening 112 and end 124 of capillary tube 12 is the capillary tube length L1. An indicator material 14 is adjacent and in contact with the opening 112. The indicator 14 is contained within a reservoir 104. The capillary tube has visible graduated indicia 102 and numerical indicia 122. A housing body 16 encloses the capillary tube 12 and indicator material 14.

In some embodiments according to the present invention, instrument 20 is constructed so that reservoir 104 and capillary tube 12 are integrally formed by fusing reservoir 104 and capillary tube 12 together and then introducing the unit formed by reservoir 104 and capillary tube 12 into the housing body 16. In such embodiment, capillary tube 12 and reservoir 114 essentially form a unit such as instrument 10 in as depicted in FIG. 1. In other embodiments according to the invention, an instrument 20 is constructed so that the reservoir 104 is part of housing body 16, and capillary tube 12 is then placed so that opening 112 is in contact with reservoir 104. A subset of embodiments according to the present invention includes an instrument 20 comprising a reusable housing body 16 and a free-standing instrument 10 as depicted in FIG. 1, comprising a reservoir 104 and capillary tube 12 that have been fused together. Other embodiments of the present invention include embodiments in which instrument 20 comprises a reusable housing body 16 comprising a refillable reservoir 104, and a disposable capillary tube 12.

In a typical process employing the instrument 20, the instrument 20 is introduced into a heating apparatus, such as a reflow oven (not shown), and is heated. As the temperature rises in the direction of a predetermined temperature, such as a solder reflow temperature, the indicator material 14 remains solid. However, when the temperature of the instrument 20 reaches the predetermined temperature the indicator material 14 melts and becomes fluid. Because the indicator material 14 is in contact with the opening 112 of the capillary tube 12, indicator material 14 begins to move into the capillary tube 12 by capillary action. This motion of 14 into capillary tube 12 is time-dependent. Advantageously there is a linear relationship between the amount of time that the indicator material 14 spends at temperatures equal to and greater than the predetermined temperature (i.e. the amount of time that indicator material 14 spends in a liquid state) and the amount of the indicator material 14 that moves into the capillary tube 12. Advantageously capillary action is not temperature dependent at temperatures above the predetermined temperature. However, it is also possible that the indicator material 14 or the bore b of the capillary tube 12 be chosen so that motion of indicator material 14 in capillary tube 12 increases with increasing temperature. Such a relationship results in the amount of indicator material 14 in the tube 12 representing an integral of temperature over time. Other relationships between the capillary action-based motion rate of the indicator material 14 in capillary tube 12 are clearly envisaged as being within the scope of the present invention.

FIG. 3 depicts a cutaway side view of an instrument 20 according to the present invention after it has been heated to temperatures equal to and greater than a predetermined temperature, and then cooled to a temperature less than the predetermined temperature. The indicator material 14 has progressed into the capillary tube 12 by capillary action. Indicator material 14 has formed a meniscus 114 marking the furthest progress of the indicator material 14 into capillary tube 12. The progress of meniscus 114 into capillary tube 12 is measured with reference to the graduated length indicia 102. The indicator length L2 between opening 112 and meniscus 114 is proportional to the amount of time that instrument 20 spent at temperatures equal to and greater than the predetermined temperature. The precise relationship between indicator length L2 and the amount of time that the instrument 20 spent at temperatures equal to and greater than the predetermined temperature is determined empirically. For instance, several identical instruments 20 according to the present invention are prepared and subjected to heating at temperatures equal to and greater than a predetermined temperature for various amounts of time, and then are cooled. The indicator lengths L2 are then measured. A time-length calibration curve is then prepared, for instance by linear regression analysis. The proper positions of graduated length indicia 102 are then determined based on this calibration curve. When the time-dependent relationship between rate of progress of indicator material 14 under capillary action through capillary tube 12 is linear, the graduated length indicia 102 are advantageously calibrated in 1 second, 5 seconds, 10 seconds, 15 seconds or 1 minute intervals. Advantageously embodiments of instrument 20 according to the present invention are manufactured in a range of calibration intervals (i.e. various lengths L1 and bores b) so that an integrated circuit package manufacturer may select an instrument 20 that is calibrated to a suitable time scale. The rate of progress of the indicator material 14 through the capillary tube 12 is dependent on a number of factors, such as the viscosity of the indicator material 14 in the liquid state, bore b of the capillary tube 12, composition of a material making up capillary tube 12, etc.

FIG. 4 depicts a side view of an instrument 20 according to the present invention after it has been heated to temperatures at and above a predetermined temperature and then cooled to a temperature below the predetermined temperature. The housing body 16 has an aperture 18 through which the capillary tube 12, the graduated length indicia 102, and the meniscus 114 of the indicator material 14 are visible. In the exemplary embodiment according to the present invention, instrument 20 has numerical indicia 122 on housing body 16 beneath aperture 18. The positions of numerical indicia 122 are aligned with corresponding graduated length indicia 102 on the capillary tube 12. The numerical indicia 122 are advantageously calibrated in seconds, tens of seconds, minutes, multiples of minutes, or hours, as appropriate, depending on the empirically determined calibration of the instrument 20.

A suitable method of manufacturing an instrument 10 according to the present invention is as follows. First, the reservoir 104 and the capillary tube 12 are formed by known glass-blowing methods, however the capillary tube is left open at end 124. Next, a heated micro needle is placed through capillary tube 12 so that its tip is within reservoir 104 and injects just enough molten indicator material 14, such as a solder, to fill reservoir 104. The reservoir 104 is held at a low temperature in a heat sink bath so that, as indicator material 14 is injected into the reservoir 104, the indicator material 14 solidifies and remains in the reservoir. The micro needle is then removed. The capillary tube 12 is then closed, for instance by cementing a plug in place or by heating end 124 with a suitable heating device, such as by fusing the end 124 with a flame. The product of the foregoing manufacturing process is an instrument 10 according to the present invention.

Figure 5:
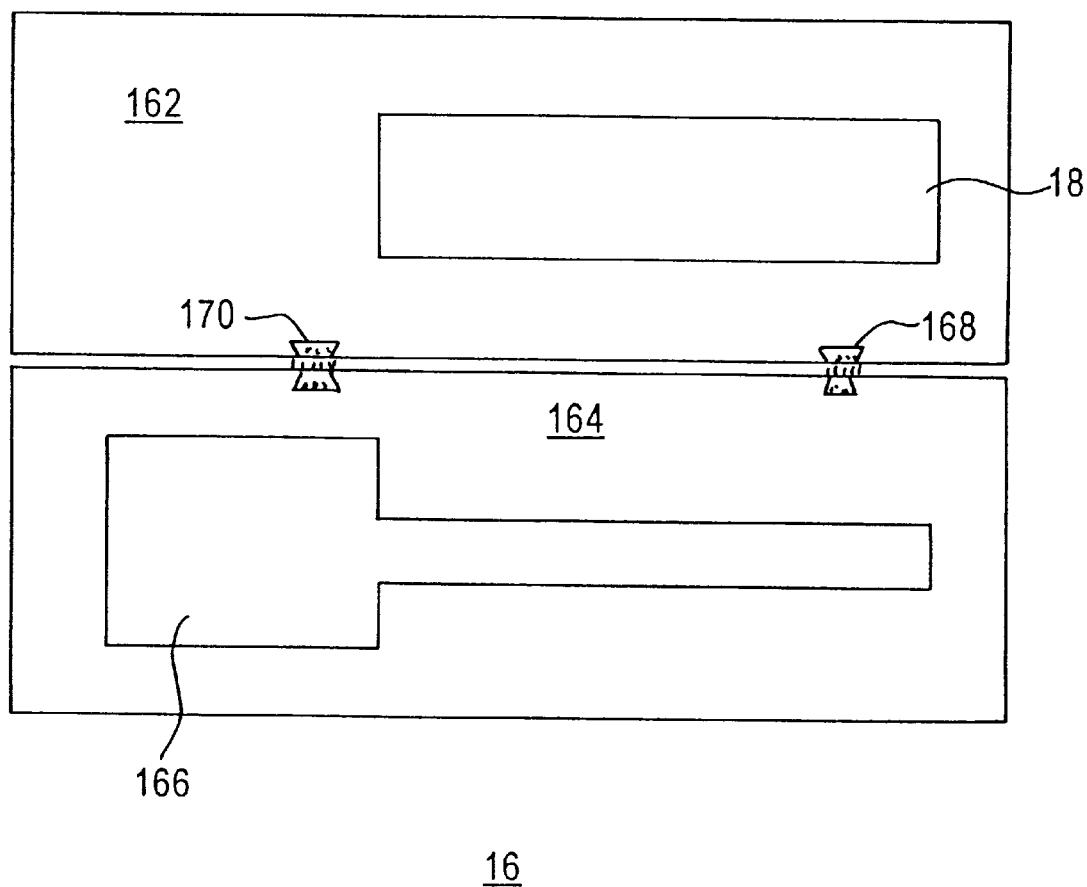
FIG. 5 is a top view of a housing body for holding an instrument according to the present invention.

FIG. 5 depicts a top view of the inside of an embodiment of a housing body 16 according to the present invention. The housing body 16 comprises a top part 162 and a bottom part 164. The top part 162 has an aperture 18, while bottom part 164 has an indentation 166 for receiving a capillary tube/ reservoir assembly as shown in FIG. 1. The top part 162 and bottom part 164 are held together by hinges 168, 170, which allow the housing body 16 to be closed by rotating top part 162 and bottom part 164 toward one another by pivoting about hinges 168, 170.

Advantageously, an exemplary housing body 16 as depicted in FIG. 5 is used together with a stand-alone instrument 10 as depicted in FIG. 1. In such cases the instrument 10 is placed within an indentation 166 of a housing body 16 as depicted in FIG. 5. The housing body 16 is then closed by pivoting top part 162 toward bottom part 164 about hinges 168, 170. A resulting instrument 20 is exemplified by the embodiment according to the present invention depicted in FIG. 4.

The indicator material 14 may be any material that is solid at temperatures below the predetermined temperature, melts at the predetermined temperature, remains liquid at temperatures above the predetermined temperature, moves into capillary tube 12 by capillary action when it is in a liquid state, and solidifies again when the indicator material 14 is cooled to temperatures below the predetermined temperature. As an example of a predetermined temperature, a solder reflow point is used. Other predetermined temperatures, such as a barrier potential breakdown temperature, are embraced by the present invention. When a solder reflow temperature is the predetermined temperature, it is dependent of course on the type of solder used. For instance, a common reflow temperature is 183° C., which is the reflow point of a typical lead-tin (Pb/Sn) solder. Other solder reflow temperatures within the scope of the present invention include melting points of high-melting solders. Typical predetermined temperatures are in the range of from 100° C. to 300° C., advantageously from about 160° C. to about 250° C.

In all cases, indicator material 14 is chosen to reflect the particular needs of the user. In the case where the predetermined temperature is a Pb/Sn solder reflow temperature, a convenient indicator material 14 comprises Pb/Sn solder, and advantageously consists essentially of Pb/Sn solder and flux. Another convenient indicator material consists of Pb/Sn solder alone. In cases where other solder reflow temperatures are chosen as predetermined temperatures, appropriate solders having melting points that are the same as the predetermined temperatures are advantageously used. For instance, when the predetermined temperature is the same as a high-melting solder reflow point, an appropriate indicator material 14 includes a high-melting solder.

Other indicator materials 14 may be waxes, polymers, metals, and metal alloys having the characteristics outlined above, i.e. in a solid state at temperatures below the predetermined temperature, melts at the predetermined temperature, remains liquid at temperatures above the predetermined temperature, moves into a capillary tube 12 by capillary action when it is in a liquid state, and solidifies again when the indicator material 14 is cooled to temperatures below the predetermined temperature. Such other indicator materials 14 are thus within the scope of the present invention.

The capillary tube 12 is advantageously a transparent glass tube, such as a borosilicate glass tube. However other materials may be used according to the present invention. Borosilicate glass is an advantageous material for capillary tube 12 as it is transparent, conducts heat, is resistant to chemical change under heating, and is resistant to volume changes at high temperatures. Other glasses and plastics having these characteristics are also useful for practicing the present invention.

The capillary tube 12 is of any useful length, depending on the anticipated duration of the instrument 20 above a predetermined temperature, the viscosity of the indicator material 14 and the inner diameter (bore) b of the capillary tube 12. A useful range of lengths of capillary tube 12 is 0.5–10 cm, for instance 2–5 cm.

When reservoir 104 is integrally formed with capillary tube 12, they are advantageously formed from the same material, such as a borosilicate glass. Typical methods of manufacturing an integral reservoir 104 and capillary tube 12 assembly is to form both simultaneously by convention methods, such as glass blowing methods. Advantageously, the end 124 of capillary tube 12 is left open so that it may receive indicator material 14 as described below.

The graduated length indicia 102 are advantageously spaced from 0.005 to 0.5 cm, apart. At the lower end of the scale, e.g. from 0.005 to 0.05 cm, however, the capillary tube 12 is advantageously viewed through the aperture 18 with a magnifying device (not shown.) In some embodiments according to the present invention, graduated length indicia 102 are spaced about 0.1 cm apart, however other spacings are possible and are envisaged as being within the scope of the present invention. The spacing of graduated length indicia 102 are predetermined and are precisely known in order to permit accurate and precise measurement of duration of the period between predetermined first and second temperatures. As mentioned above, the capillary tube 12 is made from a material, such as borosilicate glass, whose length and volume does not change appreciably with change in temperature. This ensures that the distance between length indicia 102 will remain nearly constant with temperature, thereby ensuring accurate operation of instrument 20 through a range of temperatures.

In some embodiments of the invention, capillary tube 12 possesses no graduated length indicia 102. For instance, when the amount of indicator material 14 in capillary tube 12 after heating is to be determined gravimetrically, as described below, the skilled artisan will recognize that there is no need for graduated length indicia 102. However, in such cases proper operation of an instrument according to the present invention will not be hindered by the presence of graduated length indicia 102. Additionally, automated methods of visualizing meniscus 114 in order to measure indicator length L2 do not require the use of graduated length indicia 102. Again, of course, the presence of graduated length indicia 102 does not hinder proper operation of an instrument according to the present invention. Thus, while graduated length indicia 102 are typically used for convenient manual measurement of the amount of indicator material 14 in capillary tube 12, they optionally appear on other embodiments according to the present invention.

The inner diameter b of the capillary tube 12 is such that the indicator material 14 moves by capillary action through the capillary tube at and above the predetermined temperature, which is the temperature at which the indicator material 14 undergoes phase transition from solid to liquid. In general, it is advantageous to use a combination of indicator material 14 having a particular viscosity and a capillary tube bore b, that permit the meniscus 114 of the indicator material 14 to move no farther than the full length L1 of the capillary tube 12 in the maximum time available for heating of the instrument 20. For instance, if the instrument 20 is to be heated in a reflow oven for a maximum of 20 minutes, the viscosity of the indicator material 14 and the bore b of the capillary tube 12 are matched so that the meniscus 114 will be located approximately just short of the end 124 of capillary tube 12, advantageously approximately at the last graduation indicia 102 before the end 124 of the capillary tube 12, at the end of 20 minutes. The graduated length indicia 102 are accordingly calibrated to indicate duration of heating at temperatures equal to and greater than a predetermined temperature in convenient unites of time.

The bore b of capillary tube 12 is advantageously substantially constant throughout its length from opening 112 to end 124. In other embodiments capillary tube 12 has a varying bore b. In one such embodiment, the capillary tube 12 has a bore b that varies so that the distance between meniscus 114 and opening 112 represents a logarithm of the time that the instrument 20 has been above the predetermined temperature. In other embodiments, the bore b is chosen to reflect other mathematical relationships between the distance between meniscus 114 and opening 112 and the time that the instrument 20 was above the predetermined temperature.

In certain embodiments according to the present invention, the meniscus 114 is concave. In other embodiments according to the present invention, meniscus 114 is convex or substantially planar. This depends on the particular characteristics of the indicator material 14 and capillary tube 12.

The housing body 16 may be made of any suitable material such as metal, polymer or ceramic. Suitable metals include brushed aluminum, stainless steel, and brass. Suitable polymers include polymers that are resistant to high temperatures. Suitable ceramics include silca-based ceramics manufactured by sintering processes. Suitable metals also include sintered metals. Advantageously, the housing body 16 is made of a material that is resistant to temperatures substantially higher than the predetermined second temperature. In certain embodiments according to the present invention, the housing 16 is resistant to temperatures that are 20–100° C. above the predetermined second temperature. In other embodiments, the housing 16 is resistant to temperatures 30–50° C. about the predetermined second temperature. Advantageous materials for making disposable housing bodies 16 are blow-molded polymers, which are stable to temperatures from 200–300° C.

In some embodiments according to the present invention, the reservoir 104 is integral with the housing body 16. In other embodiments, the reservoir 104 may be separately constructed of a material that is inert to the indicator material 14. Other embodiments are also contemplated as being within the scope of the present invention, and are chosen with a mind toward considerations such as cost, manufacturing efficiency, and inertness to the chosen indicator material.

The reservoir 104 may be of any suitable shape. In some embodiments according to the present invention the reservoir 104 is cubical. In other embodiments it is frustoconical, spherical or oblate-spheriodal. The ordinary artisan chooses the shape of reservoir 104 based on manufacturing convenience, etc. For instance, in the case of an embodiment such as free-standing instrument 10, a cubical shape is advantageous due to its ability to stand vertically, or for several such instruments to be packed together in a box. In other embodiments, a frusto-conical shape is advantageous for its vertical stability. In other embodiments, spherical or oblate-spheroidal shapes are advantageous for their ease of manufacture. These shapes are achieved by any means common in the glass-blowing, machining or sintering arts, as the case requires.

The aperture 18 in housing body 16 is advantageously an opening in the housing body 16 through which the capillary tube 12, meniscus 114, graduated indicia 102 and numerical indicia 122 may be viewed. In some embodiments of the invention, the aperture 18 is fitted with a transparent window (not shown), such as a glass or polymer window. In some embodiments according to the present invention, aperture 18 is fitted with a transparent glass magnifying lens (not shown). Other embodiments that permit viewing of capillary tube 12, meniscus 114, graduated indicia 102 and numerical indicia 122 are within the scope of the present invention.

In operation, embodiments of the present invention, including a free-standing instrument 10 and an instrument 20 having a housing body, operate similarly. The ordinary artisan chooses between these embodiments based upon the needs of the present situation. For instance, a free-standing instrument 10 would is advantageously chosen for its disposability, its compactness, or its convenience of use. Advantageously several instruments according to the present invention having different predetermined temperatures are placed on a rack in a heating device such as a reflow oven. The user then uses the several instruments to formulate a graph of temperature versus time. In this regard, mixtures of high and low melting waxes or polymers having different melting temperatures are especially useful as indicating materials in the several instruments according to the present invention.

In some embodiments according to the present invention, instrument 20 comprises a disposable instrument 10 and a reusable housing body 16. Initially, the housing body 16 is empty. A stand alone instrument 10 is then placed within the housing body 16 to form an instrument 20, and is removed after use. The housing body 16 is then reused, by replacing the reservoir 104 and capillary tube 12 between heating and cooling cycles. In such embodiments, the housing body 16 is advantageously made of a resilient material that tolerates several cycles of heating and cooling.

In some embodiments according to the present invention, an instrument 20 having a housing body 16 is formed from a housing body 16 in which reservoir 104 is an integral part and is pre-filled, and is refillable, with indicator material 14, and the capillary tube 12 is a disposable member. In such embodiments, an the instrument 12 is subjected to a heating and cooling cycle in a heating device such as a reflow oven (not shown). After cooling, the value of indicator length L2 may be determined by viewing the position of meniscus 114 with respect to the graduated length indicia 102 and numerical indicia 122. In alternative embodiments the capillary tube 12 containing indicator material 14 is removed manually or automatically from housing body 16, and the amount of indicator material 14 in capillary tube 12 is measured gravimetrically using a balance, such as a microbalance. In either case, the capillary tube 12 containing indicator material 14 is then disposed of, additional indicator material 14 is introduced into reservoir 104 in housing body 16 if necessary, and a new capillary tube 12 is positioned within housing body 16 to reconstitute the instrument 20 according to the present invention. Other embodiments of the present invention are envisaged as being within the scope of the present invention.

Figure 6:
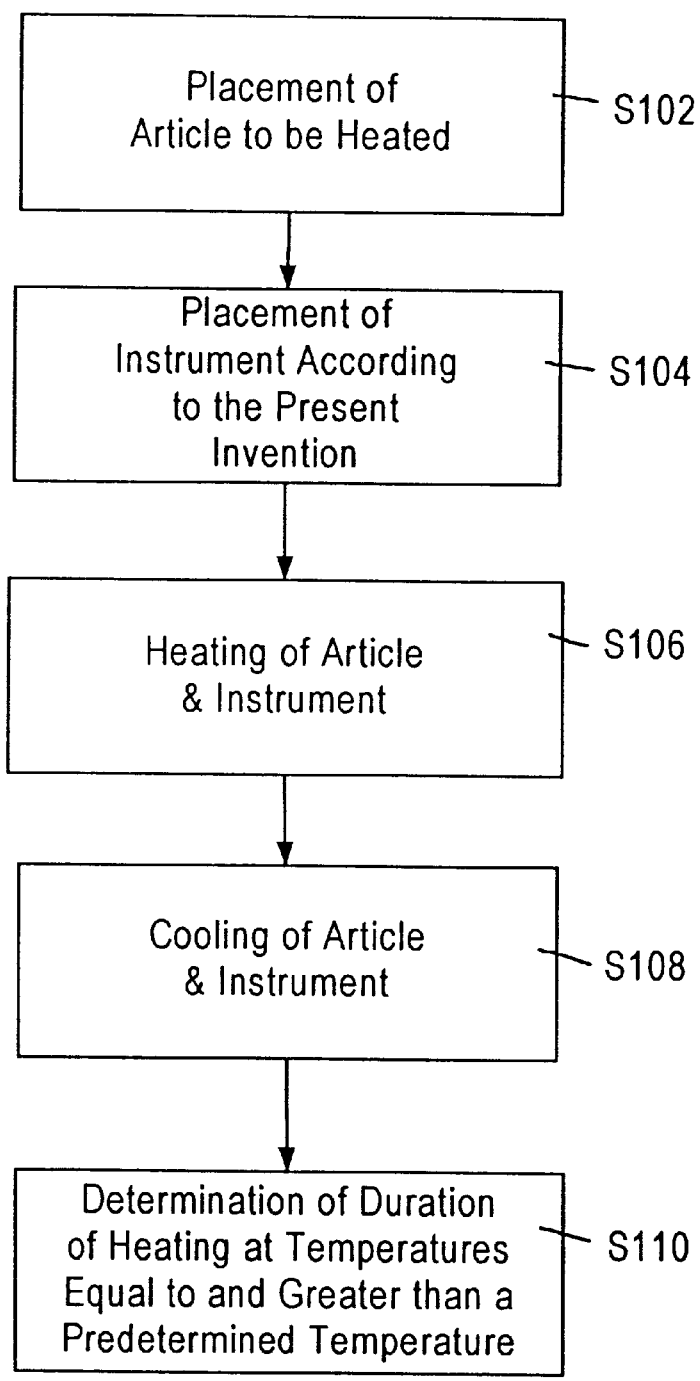
FIG. 6 is a block diagram depicting the steps in a method according to the present invention.

FIG. 6 depicts a block diagram of an exemplary embodiment of a method of determining duration of temperatures at an above a predetermined temperature according to the present invention. In S102, an article to be heated is provided by, for instance, placing it in a heating device, such as a reflow oven. A suitable article to be heated is, for instance, an integrated circuit package to be reflowed. A suitable reflow oven is a zone heating reflow oven having a conveyor running through the length of the reflow oven. Advantageously the conveyor comprises a vessel, such as a boat, for receiving an article to be heated, such as an integrated circuit package assembly. In embodiments according to the present invention employing a reflow oven comprising a conveyor and a boat, an integrated circuit package assembly to be reflowed is placed in the boat.

In S104, an instrument according to the present invention is placed in proximity to the article to be heated. In embodiments according to the present invention employing a reflow oven comprising a conveyor and a boat, an instrument according to the present invention is advantageously placed in the boat. In other embodiments, an instrument according to the present invention is placed on the conveyor. In any case, an instrument according to the present invention is placed in close enough proximity to the article to be heated that both the instrument and the article are simultaneously heated. or are subject to substantially similar heating cycles. In some embodiments according to the present invention, identical instruments according to the present invention are placed in separate boats, one containing an article to be heated and another in a neighboring boat containing no article to be heated. Such a process embodiment permits estimation of the effect of an article's coefficient of heating on the local temperature in the vicinity thereof.

In S106, an instrument according to the present invention and the article to be heated are both heated in the heating device. In embodiments of the method according to the present invention employing a reflow oven having a conveyor, the instrument according to the present invention and the article to be heated are conveyed into the oven by the conveyor, where heating elements, such as incandescent bulbs, resistively heated black bodies, or microwave emitting devices, heat the instrument according to the present invention along with the article to be heated.

In S108, an instrument according to the present invention and the article to be heated are cooled to a temperature less than the predetermined temperature, typically to room temperature. In embodiments of the method according to the present invention employing a reflow oven having a conveyor, the instrument according to the present invention and the article to be heated are conveyed out of the oven by the conveyor and are typically allowed to cool to room temperature.

In S110, the length of time that the instrument according to the present invention was heated to temperatures equal to and greater than the predetermined temperature, such as a reflow temperature, is determined by reference to the instrument according to the present invention. In some embodiments, the length of time at and above the predetermined temperature is determined visually, for example with a human operator or a computer equipped with machine vision. In other embodiments, the length of time at and above the predetermined temperature is measured gravimetrically by an automated balance, which extracts the capillary tube and its indicator material contents from the instrument and compares the mass of the indicator material with a calibration curve of mass of indicator material versus time, that has been previously prepared. Determination of the mass of the indicator material is advantageously accomplished by heating the capillary tube and its contents to a temperature greater than the melting point of the indicator material, and aspirating the indicator material onto a weighing pan of a microbalance, or by comparison of the mass of a capillary tube and its indicator material contents with the mass of a standard, empty capillary tube. Both methods of determining mass are conducive to automation.

In some embodiments of the method according to the present invention, steps S102 and S104 are reversed. Also, in some embodiments of the method according to the present invention, a reflow oven without a conveyor is used. In such embodiments, the instrument according to the present invention and the heating device, such as a reflow oven, the heating device is heated to a temperature at or above the a solder reflow temperature, and then the oven is turned off and allowed to cool. Alternatively, the article and instrument according to the present invention are extracted from the oven and allowed to cool.

As can be seen above, embodiments of the present invention are useful at a variety of temperatures, which permits them to be used in a variety of industrial manufacturing processes. Some instruments according to the present invention are used separately, either as stand-alone instruments or as instruments having a housing body. Other instruments according to the present invention are manufactured to have varying predetermined temperatures, and the various instruments are used together to provide data for compiling time-temperature curves that accurately reflect the actual temperature in proximity to an article to be heated, such as an integrated circuit package assembly in an reflow oven. Additionally, some instruments according to the present invention having various predetermined temperatures are combined in a kit comprising several such instruments. Instruments according to the present invention having various useful time ranges are also provided, and these also may be combined to form a kit. Some embodiments of instruments according to the present invention offer the convenience of disposability, while others are adapted to permit replacement of expended parts, such as capillary tubes, while conserving more costly parts such as housing bodies.

The present invention provides an instrument capable of accurately and precisely measuring the amount of time that the instrument spends at temperatures at and above a predetermined temperature. In certain embodiments of the invention, the instrument allows, for instance, for accurate and precise measurement of time that the instrument and an integrated circuit assembly in proximity thereto spends at temperatures at and above a reflow temperature in a reflow oven. Using an instrument according to the present invention, it is possible to accurately and precisely measure duration of heating at temperatures at and above a reflow temperature, thereby gaining valuable empirical data regarding the amount of time that integrated circuit components, package substrates, and assemblies thereof spend at temperatures at and above, for instance, a solder reflow temperature. In other embodiments, an instrument according to the present invention indicates the integral of temperature over time. Embodiments according to the present invention are useful either as stand-alone instruments, or as instruments including a housing body. The time and temperature data provided by an instrument according to the present invention provides valuable empirical data to an integrated circuit packaging manufacturer, which permits integrated circuit manufacturers to develop more exacting and cost-effective processes for manufacturing packaged integrated circuits.

Other applications for an instrument according to the present invention are practical and are envisaged within the scope of the present invention. In general, an instrument according to the present invention is useful wherever it is desired to measure a duration of temperatures above a predetermined temperature. For instance, instruments according to the present invention find applications within polymer heat curing, coating and baking arts. Other applications of instruments according to the present invention are apparent to those working in those arts.

While this invention has been described in connection with what is presently considered to be the most practical and preferred embodiments, it is to be understood that the invention is not limited to the disclosed embodiments, but, on the contrary, is intended to cover various modifications and equivalent arrangements included within the scope of the appended claims.

What is claimed is:

1. An instrument for measuring duration of heating above a predetermined temperature comprising:
   a hollow capillary tube having an opening; and
   a indicator material;
   the indicator material being outside the capillary tube and adjacent and in contact with the opening and having a melting point equal to the predetermined temperature.

2. An instrument according to claim 1, further comprising a reservoir containing the indicator material.

3. An instrument according to claim 1, further comprising a housing body encompassing the capillary tube and indicator material.

4. An instrument according to claim 3, wherein the housing body has an aperture through which the capillary tube is visible.

5. An instrument according to claim 1, wherein the indicator material is a metal or metal alloy.

6. An instrument according to claim 5, wherein the indicator material is a solder.

7. An instrument according to claim 6, wherein the indicator material is a lead-tin solder.

8. An instrument according to claim 1, wherein the predetermined temperature is a melting temperature of a solder.

9. An instrument according to claim 1, wherein the capillary tube has visible graduated length indicia.

10. An instrument according to claim 4, wherein the housing body has numerical indicia.

11. A method for measuring the duration of an article at temperatures above a predetermined temperatures comprising:
    providing an instrument comprising a hollow capillary tube having an opening and a indicator material outside the capillary tube and adjacent and in contact with the opening, and having a melting temperature equal to the predetermined temperature;
    placing the instrument in proximity to an article to be heated;
    heating the instrument and article;
    cooling the instrument and article;
    measuring the amount of indicator material in the capillary tube; and
    determining from the amount of indicator material in the capillary tube the duration of the article at temperatures above the predetermined temperature.

12. A method according to claim 11, wherein the predetermined temperature is a melting point of a solder.

13. A method according to claim 11, wherein the article to be heated is an integrated circuit assembly.

14. A method according to claim 11, wherein the article and device are placed together on a boat of a reflow oven.

15. A method according to claim 11, wherein the indicator material is a solder.

16. A method according to claim 15, wherein the indicator material is a lead-tin solder.

17. A method according to claim 11, wherein the capillary tube has visual graduated length indicia and the amount of indicator material in the capillary tube is measured visually by observing the distance that a meniscus of the indicator material has traveled into the capillary tube with reference to the graduated length indicia.

* * * * *